May 28, 1935.  E. W. MILLER  2,002,746
STEERING GEAR
Filed Dec. 7, 1932  2 Sheets-Sheet 1

Inventor
Edward W. Miller
by Wright, Brown, Quinby they
att'ys

May 28, 1935.　　　　E. W. MILLER　　　　2,002,746
STEERING GEAR
Filed Dec. 7, 1932　　　2 Sheets-Sheet 2
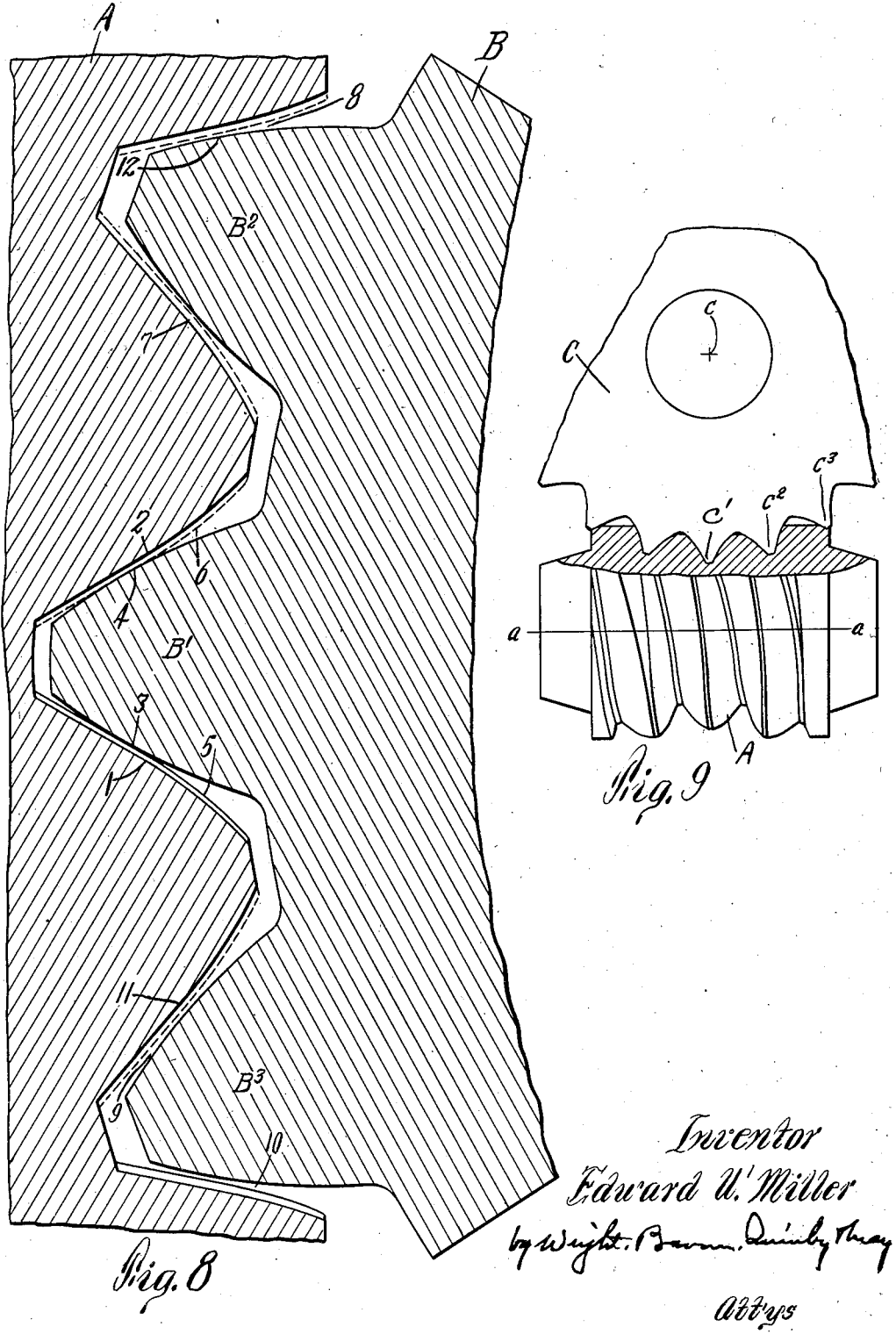
Inventor
Edward W. Miller Patented May 28, 1935

2,002,746

UNITED STATES PATENT OFFICE 2,002,746

STEERING GEAR

Edward W. Miller, Springfield, Vt., assignor to The Fellows Gear Shaper Company, Springfield, Vt., a corporation of Vermont Application December 7, 1932, Serial No. 646,093

14 Claims. (Cl. 74—458)

The present invention relates to worm and wheel gearing or gear couples, such as those used in automobiles for transmitting motion from the hand steering wheel to the steering road wheels of the car. In such steering gears a worm element is secured on the hand wheel shaft and an intermeshing gear segment carried by a transverse shaft, from which angular motion is transmitted to the road wheels by linkages. The invention comprises certain improvements in the worm and gear segment couple by which more exact and accurate control of the manufacture and better efficiency in performance of the gearing are obtained, and manufacturing economies are effected; as will more fully appear from the following detailed description of certain specific embodiments of the invention.

Referring to the illustrative drawings herewith furnished,—

Fig. 8 is an enlarged section of the couple taken on the plane which contains the axis of the worm and is perpendicular to the axis of the segment;

Fig. 9 is a plan view of the cutter by which the worm is made, shown in its relationship to the worm at the end of the cutting operation.

Like reference characters designate the same parts wherever they occur in all the figures.

The worm element is designated by the letter A, and the gear segment by the letter B. In conformity with the common practice in steering gear transmissions, the axis $a, a$ of the worm extends in a direction making an angle of 90° with the direction in which the axis $b, b$ of the gear segment extends. Each axis therefore is in a plane at right angles to the other axis.

The worm is of the Hindley or hour glass type having a thread or helix disposed in a number of convolutions, and is so located that its middle transverse plane, that is, the throat or gorge plane, is radial to the axis of the segment; while a median plane of the segment (that is, any plane between the ends of its teeth and perpendicular to its axis, and far enough removed from both ends to obtain the character of bearing engagement later described) is radial to the worm. Thus the common perpendicular to both axes is contained in both the gorge plane of the worm and a median plane of the segment.

The gear segment has spur gear teeth; and in this specification I use the term "spur" with the definition commonly understood in the art of gearing, as meaning teeth which are parallel to the axis of the gear, in distinction from the types of teeth found in bevel, helical and crown gears, etc. Preferably the faces of these teeth are of involute curvature; and I find that teeth of this type generated to a pressure angle of approximately 30° give eminently satisfactory results and are highly efficient in the performance of the service required. There are three teeth, which is a number sufficient for the purpose and has certain practical advantages, understood by persons skilled in the art, over either a larger or a smaller number of teeth. Such a gear can be economically manufactured with close control of accuracy and the ability to make interchangeable duplicates by present commercial gear shaping methods and machines. The teeth are all alike in form and are equidistant from the axis on which the segment is mounted to turn. In the central operating position of the segment, the middle radius of its middle tooth B' coincides with the throat plane of the worm.

Figure 4:
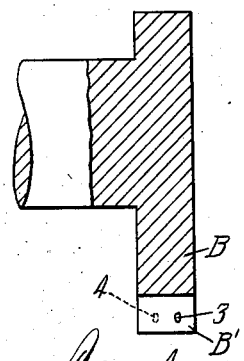
Fig. 4 is a sectional view of the gear segment taken on line 4—4 of Fig. 1.
Figure 3:
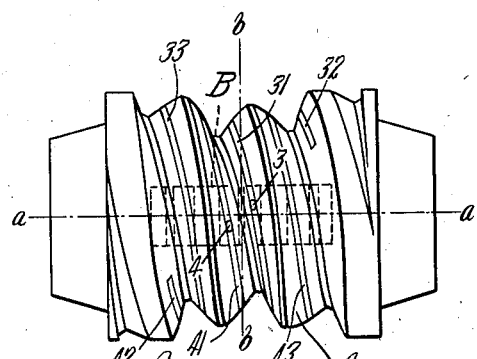
Fig. 3 is a view of the worm as seen from a point above Fig. 2 with a projection thereon of the gear segment in dotted lines.
Figure 5:
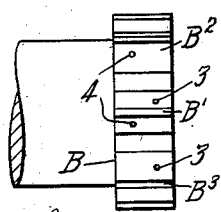
Fig. 5 is a plan view of the middle tooth of the segment with an indication thereon of the areas on which it makes contact with the flanking turns of the worm helix.

The worm thread is made with its sides straight in axial profile from the root to a height slightly beyond the points on which it makes contact with the teeth of the segment; and the width and inclination of the groove between adjacent convolutions of the thread are made of such values as to receive the segment teeth without interference, and particularly without any undercutting at the ends of the worm. Referring to Fig. 8, which shows on an enlarged scale the section of the worm and segment on the plane which includes the axis of the worm and is perpendicular to the axis of the segment, it will be seen that the sides of the thread are straight in profile from the root to points 1 and 2, and that the segment teeth make contact with the worm at points 3 and 4, which are within the points 1 and 2 respectively. Owing to the fact that the segment teeth are spur teeth, while the worm thread is a helix, these points of contact are at respectively opposite sides of this plane of section. The contact point 3 therefore falls on that part of the thread, back of the plane of section, which is designated by the line 5, while the contact point 4 comes on a part of the thread in front of the plane of section, the projection of which is indicated by the broken line 6. The approximate location of these contact points are shown in Figs. 3, 4 and 5 also.

Between the top of the thread and the points 1 and 2, the sides of the thread are given a convex curvature which, in the axial profile, is a circular curve of large radius. This curvature affords clearance between the thread and gear teeth and enables the outer turns of the thread to bear with smooth and gentle tangent contact, as distinguished from edge contact, on one or the other of the outer teeth $B^2$ or $B^3$ when the gearing is turned to an extreme position in either direction.

Figure 1:
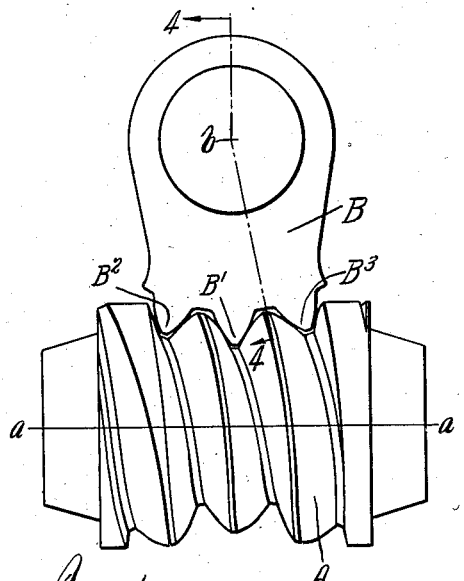
Fig. 1 is an elevation of the worm and gear couple in mid position.

When the gearing is in mid position (Figs. 1, 3 and 8), only the middle tooth B' of the segment bears on the worm thread. The lateral or flanking teeth $B^2$ and $B^3$ are clear of contact with the worm, by reason of the fact that they are thinner than the middle tooth, are arranged on a pitch circle of shorter radius than the meridian pitch curvature of the worm, and have a slightly shorter pitch spacing than the thread convolutions. Thus while the points or areas 3 and 4 of tooth B' engage the flanking turns of the thread on the zones 31 and 41, there are clearances at 7 and 8 between the lateral tooth $B^2$ and the nearest points of the thread, and corresponding clearances at 9 and 10 between the thread and the opposite lateral tooth $B^3$. Owing to the dimensions and positioning of these lateral teeth, the clearances at 8 and 10 are somewhat wider than those at 7 and 9 respectively.

Figure 2:
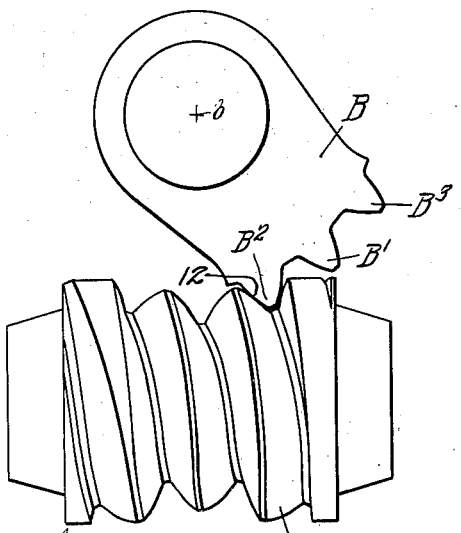
Fig. 2 is a similar view showing the elements of the gearing in nearly an extreme position.

As the gearing is rotated, say into the position shown in Fig. 2, the point 12 on the outer side of the tooth $B^2$ is gradually approached and contacted by the bearing zone 42 of the thread, while the middle tooth is gradually freed of constraint. As rotation of the worm proceeds in the same direction the zones 41 and 43 of the thread (which are parts of the same helix as zone 42) progressively come to bear on the same point of the tooth. With rotation in the opposite direction from mid position the helical zone 32, 31, 33 bears on the outer side of tooth $B^3$, while the other teeth are clear. Thus the mechanism is tight when the gear is in position for steering straight ahead or with only slight deviations, as is desirable for safety in driving a car rapidly, while the mechanism is free when set to enable the car to make a sharp turn, as is desirable from the standpoint of ease of manipulation.

The effects and characteristics last described are most conveniently secured in practice by cutting the worm by means of a circular cutter having a peripheral series of teeth, with cutting edges at one end, arranged on a pitch circle of larger diameter than the pitch circle of the teeth of the gear segment; the outlines of such cutter teeth being the complement of the prescribed shape of the groove between turns of the worm thread. Such cutter is indicated in Fig. 9 by the letter C, and its teeth are designated C', $C^2$, $C^3$, etc. It is operated according to a well known method of screw cutting with its axis c in the throat plane of the worm and perpendicular to an axial plane of the worm, while its cutting edges are located in the latter plane. Starting the cutting operation by the points of the cutter teeth on the outside diameter of the worm blank, with rotation of the cutter and blank at harmonius speeds about their respective axes, either the worm blank or the cutter is fed radially toward the other until the center distance between them becomes that prescribed by their predetermined pitch diameters.

In designing a gear couple according to this invention, the pitch, height and thickness of the worm thread are determined by the conditions of the problem, and the angle of the thread groove is selected as of sufficient width to avoid undercutting and interference at the ends. In practice an angle of 30° is amply wide for this purpose and is satisfactory otherwise. More or less variation from this angle is permissible, however. The face curves of the gear teeth are designed in accordance with well known principles of involute gearing with an equal pressure angle, and the thickness of the teeth such that they will engage the thread at the prescribed pitch points, such as those indicated at 3 and 4. The meridian curvature of the worm is made enough greater than the pitch curvature of the segment to insure the character of mesh previously described. In the specific illustration here given, the ratio of the pitch radius of the gear to the meridian radius of the worm is as 17 to 20 but this also is a value which can be considerably varied.

In speaking previously of the points of contact between the segment and worm I have had reference to the centers of bearing. In practice the bearing areas have appreciable dimensions.

Figure 6:
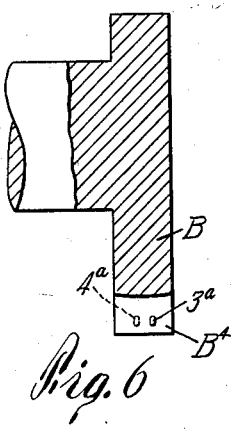
Fig. 6 is a view similar to Fig. 4 showing a modification of the segment designed to bring the bearing points nearer to the middle plane of the segment.
Figure 7:
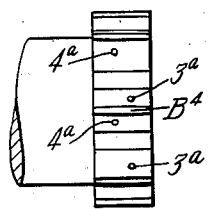
Fig. 7 is a plan view of the middle tooth of such modified segment.

Reference has also been made to the fact that the tooth bearing areas 3 and 4 are located at respectively opposite sides of the median plane of the segment. This spread between the contact points always occurs in greater or less degree if the surface elements of the tooth faces are straight lines parallel to the segment axis and if this axis extends at 90° to the worm axis, the distance of spread being a function of the helical inclination of the worm thread. The invention includes, however, provisions for locating the bearing areas nearer to the plane referred to. Such provisions consist in making the segment teeth with a crowned formation, shown in an exaggerated way in Figs. 6 and 7. The central tooth $B^4$ of this modification, and both flanking teeth as well, have their greatest thickness at the middle and are narrowed gradually toward both ends, which makes their faces outwardly bowed or crowned. The curvature of crowning may be circular, but is not necessarily so, and may be a curve of other character. When the segment so formed is put in mesh with the worm, the thickest parts of the teeth are placed in or near an axial plane of the worm, whence the crowning form of the sides brings the bearing areas 3a, 4a nearer to the same median plane of the gear than the points 3 and 4 in the preceding case, whatever may be the helix angle of the worm thread.

It is to be understood that the invention is not limited in any of its phases to gearing of the specific proportions or dimensions here illustrated.

I claim:

1. A steering gear couple consisting of an hour glass worm having a thread with bearing portions of which the opposite sides are straight in axial profile, and a complemental gear segment having spur teeth which as a whole are parallel to its axis and are conjugate to the thread convolutions on a pitch circle of smaller radius than the pitch meridian of the worm.

2. A steering gear couple consisting of an hour glass worm having a thread with bearing portions of which the opposite sides are straight in axial profile, and a complemental gear segment having involute spur gear teeth of which the long dimension is parallel with the axis of the segment.

3. A steering gear couple consisting of an hour glass worm having a thread, and a complemental gear segment having spur gear teeth parallel to its axis and constructed so that, when mounted with its middle radius coinciding with the shortest diameter of the worm, its middle tooth is in simultaneous bearing with the contiguous sides of two convolutions of the worm thread and its teeth at each side of said middle tooth are clear of the thread.

4. A steering gear couple comprising a throated worm and a complemental gear segment mounted in mesh with one another so that the common perpendicular to their respective axes lies in the smallest cross section of the worm and between the ends of the gear segment, said worm having a single thread of which the face elements in radial planes are substantially straight, and the gear segment having spur teeth parallel to its axis of which the middle tooth bears at both sides on the contiguous convolutions of the thread and the gear teeth at opposite sides of said middle tooth are out of contact with the worm threads when the segment is in mid position, and each side tooth is formed to come into bearing on its outer side with the worm thread when displaced toward and across the position formerly occupied by the middle tooth, in the operation of the gearing.

5. A steering gear comprising a throated worm having a thread provided with bearing portions of which the sides are straight in profile and make equal angles with the median radius of the thread, said sides being curved with a convex curvature outside of the bearing portions, combined with a mating segment having spur teeth.

6. A steering gear as set forth in claim 5 in which the teeth of the gear segment are arranged on a pitch circle concentric with the rotational axis of the segment and of shorter radius than the meridian curvature of the pitch surface of the worm.

7. A steering gear comprising an hour glass worm and a spur gear segment having three teeth parallel with its axis; the rotational axis of said segment being in the plane perpendicular to the axis and passing through the smallest diameter of the worm, and the central one of said teeth being symmetrically located with respect to said plane when in mid position, the thread of the worm being disposed to engage said central tooth on both sides when in the mid position and at the same time to clear the lateral teeth of the segment.

8. A steering gear as set forth in claim 7, in which the sides of the worm have zones of engagement with said segment teeth and are straight lines in axial profile from the root outwardly to said zones of engagement, and have a convex curvature outside of said points.

9. A steering gear comprising an hour glass worm and a gear segment having involute spur teeth disposed with its rotational axis in the plane perpendicular to the axis, and passing through the smallest diameter of the worm and with its central tooth symmetrically located with respect to said plane when in mid position; the thread of the worm being arranged to engage said central tooth simultaneously on both sides when in such position and at the same time to clear the lateral teeth of the segment, the pitch and radius of meridian curvature of the worm being greater than the pitch and pitch circle radius of the gear teeth whereby, on turning in either direction, one of the lateral teeth of the gear comes into bearing on its outer side with the thread when near the former position of the central tooth.

10. A steering gear as set forth in claim 9, in which the sides of the worm thread are straight in profile in those portions which cross the pitch line of the gear, and have a convex clearance curvature in their outer parts.

11. A steering gear couple comprising a throated worm and a spur gear segment, the teeth of said segment being as a whole parallel to the segment axis but crowned with their greatest thickness in a plane perpendicular to the axis of the segment and intermediate the end faces of the segment, such teeth being of diminishing thickness toward each end from such plane; the segment being meshed with the worm in such position that said plane includes or is near the axis of the worm.

12. Gearing comprising a worm and a spur gear element in mesh with said worm on an axis perpendicular to a plane containing the worm axis, the teeth of said gear element being as a whole parallel to the segment axis and crowned with a gradually increasing thickness from both ends toward the middle.

13. Gearing comprising a throated worm and a spur gear element in mesh with said worm on an axis lying in the plane which includes the axis, and passes through the smallest diameter, of the worm, the teeth of said gear element being as a whole parallel with the segment axis and crowned with a convex curvature and located with their greatest thickness in an axial plane of the worm.

14. A steering gear couple comprising a throated worm and a complemental gear segment mounted in mesh with one another so that the common perpendicular to their axes lies in the plane of smallest cross-section of the worm, said worm having a single thread and the gear segment having spur teeth parallel to its axis, so proportioned that the middle tooth when in mid position contains said common perpendicular and bears simultaneously at both sides on the contiguous convolutions of the worm, its opposite bearing areas being at respectively opposite sides of the plane defined by said common perpendicular and the worm axis.

EDWARD W. MILLER.